(12) United States Patent
Erben et al.

(10) Patent No.: US 7,832,686 B2
(45) Date of Patent: Nov. 16, 2010

(54) COMBINED DISPLACEMENT AND SWIVEL MECHANISM

(75) Inventors: Johann Konrad Erben, Hamburg (DE); Jan Wijnia, Espel (NL)

(73) Assignee: Airbus Deutschland GmbH (DE)

( * ) Notice: Subject to any disclaimer, the term of this patent is extended or adjusted under 35 U.S.C. 154(b) by 365 days.

(21) Appl. No.: 11/466,683

(22) Filed: Aug. 23, 2006

(65) Prior Publication Data

US 2007/0045471 A1 Mar. 1, 2007

Related U.S. Application Data

(60) Provisional application No. 60/710,632, filed on Aug. 23, 2005.

(30) Foreign Application Priority Data

Aug. 23, 2005 (DE) .................. 10 2005 039 846

(51) Int. Cl.
*B64C 1/14* (2006.01)
(52) U.S. Cl. .................. 244/129.5; 16/366; 16/370; 49/246; 49/248
(58) Field of Classification Search .............. 16/366, 16/370, 288; 49/246–249, 261; 244/129.1, 244/129.4, 129.5
See application file for complete search history.

(56) References Cited

U.S. PATENT DOCUMENTS

| | | | | |
|---|---|---|---|---|
| 2,531,263 A | * | 11/1950 | Fink et. al. | 182/97 |
| 2,599,834 A | * | 6/1952 | Jenkins | 16/370 |
| 2,882,004 A | * | 4/1959 | Leishman | 248/284.1 |
| 2,931,599 A | * | 4/1960 | McQuilkin | 244/129.6 |
| 3,213,962 A | * | 10/1965 | Clark, Jr. | 182/78 |
| 3,339,226 A | * | 9/1967 | Brown | 16/288 |
| 3,465,991 A | * | 9/1969 | Banas et al. | 244/137.2 |

(Continued)

FOREIGN PATENT DOCUMENTS

DE 33 05 451 2/1983

*Primary Examiner*—Timothy D Collins
*Assistant Examiner*—Philip J Bonzell
(74) *Attorney, Agent, or Firm*—Ostrolenk Faber LLP

(57) ABSTRACT

The present application relates to a specially designed hinge mechanism (4) which makes it possible to construct an aircraft door (2) that can be fitted in a fuselage (3) so as to be displaceable and swivellable on the fuselage (3). Furthermore, the invention relates to an aircraft door (2) comprising at least one such hinge mechanism (4) designed in this way, to a fuselage (3) with at least one aircraft door (2) that is linked to at least one hinge mechanism (4), designed in this way, on the fuselage (3), as well as to the use of at least one hinge mechanism (4) for installation of an aircraft door (2) on a fuselage (3). The hinge mechanism (4) essentially comprises a displacement mechanism (5, 6) as well as a telescopic scissor-type mechanism (7-12). The displacement mechanism (5, 6) can be linked to an aircraft door (2) and is kinematically designed such that as a result of its activation the aircraft door (2) can be displaced from its home position in the direction of the fuselage (3). The scissor-type mechanism (7-12) can be linked to a fuselage (3) and is kinematically designed such that as a result of its activation the aircraft door (2) is displaceable from the fuselage (3) to a final position, on a polar axis that is aligned perpendicularly in the direction of displacement.

17 Claims, 14 Drawing Sheets

U.S. PATENT DOCUMENTS 3,791,073 A * 2/1974 Baker .......................... 49/249
4,479,622 A * 10/1984 Howse .................... 244/129.5
4,497,462 A * 2/1985 Hamatani ................ 244/129.5
4,510,714 A * 4/1985 Kasper et al. ................. 49/249

* cited by examiner

COMBINED DISPLACEMENT AND SWIVEL MECHANISM

TECHNICAL FIELD

The present invention generally relates to the technical field of kinematics of hinge mechanisms. In particular, the invention relates to a hinge mechanism for an aircraft door that can be fitted in a fuselage, which mechanism makes it possible for the aircraft door to carry out a combined displacement and swivel movement. Furthermore, the invention relates to an aircraft door with at least one mechanism designed in this way. Moreover, the invention relates to a fuselage with at least one aircraft door that is linked to the fuselage with at least one hinge mechanism designed in this way, as well as to the use of at least one hinge mechanism for the installation of an aircraft door on a fuselage.

BACKGROUND TO AN EXEMPLARY EMBODIMENT OF THE PRESENT INVENTION

Many aircraft comprise doors that can be hinged out of the fuselage, which doors can be hinged from the fuselage by way of a hinge element that is arranged in the foot region of the door. Such hinged doors are, for example, known from larger aircraft such as the A310 (Airbus) or the B767 (Boeing) and also from smaller propeller aircraft such as, for example, the ATR42/72, the Canadair Dash 8, the Bombardier 604 and many smaller short-haul aircraft.

However, technical implementation of the above-mentioned hinged doors is associated with certain disadvantages in that these doors are, for example, not true "plug-type" doors, which in specialist terminology refers to doors that can be fitted flush to a fuselage and during which fitting procedure automatically lock in a positive-locking manner in the corresponding fuselage aperture. Furthermore, in addition to the door hinge that is present anyway, the known technical implementations of the above-mentioned hinged doors often require additional stabilisation—and guide mechanisms such as, for example, braces or cables in order to move the door in a controlled manner from a start position, in which it is fitted flush in the fuselage, to an end position, in which it is completely hinged out of the fuselage. Known hinged doors are thus associated with a certain degree of susceptible technical complexity, for example in the form of additional locking mechanisms or the above-mentioned stabilisation—and guide mechanisms for opening and closing, as a result of which the failure probability of the door as well as the accident probability during emergency operation increases.

PRESENTATION OF THE INVENTION

Starting from the previously described problems and disadvantages of known hinged doors, in particular of plug-type doors, it may be an object of the present invention to state an implementation by which the above-described difficulties can at least partly be reduced.

This object may be met by a hinge mechanism, by an aircraft door, by a fuselage as well as by the use of at least one hinge mechanism with the characteristics of the independent claims.

The hinge mechanism according to an exemplary embodiment of the present invention is designed such that an aircraft door that can be fitted to the fuselage with the hinge mechanism can be caused to make a combined displacement and swivel movement. The hinge mechanism according to an exemplary embodiment of the present invention comprises a displacement mechanism as well as a telescopic scissor-type mechanism. In this arrangement the displacement mechanism is arranged such that it can be linked to the aircraft door. Furthermore, from the point of view of kinematics, the displacement mechanism is arranged such that by means of its activation, the aircraft door can be displaced from an initial position in the direction of the fuselage. In contrast to this, the telescopic scissor-type mechanism is designed so as to be linkable to the fuselage. From the point of view of kinematics the scissor-type mechanism is designed such that by means of its activation, the aircraft door can be hinged from the fuselage to a final position on a polar axis that is aligned so as to be perpendicular in relation to the direction of displacement. In this arrangement the hinge mechanism according to an exemplary embodiment of the present invention is designed such that the displacement mechanism kinematically interacts with the scissor-type mechanism such that, as a result of continuous operation of one of the two mechanisms, only one of these two mechanisms is activated.

If, in the context of the present invention, there is a reference to the ability, using the hinge mechanism, to open an aircraft door in a controlled manner from a start or home position to a final position, this of course also means that the hinge mechanism according to an exemplary embodiment of the present invention may make it possible to move the aircraft door from the final position back to the home position. As explained above, the displacement mechanism has been designed such that by its activation, the aircraft door can be displaced, from a home position, in the direction of the fuselage. However, displaceability in the direction of the aircraft fuselage does not just refer to the aircraft door being able to be displaced in longitudinal direction of the fuselage; instead, displacement in the direction of the fuselage also means that the door can be displaced almost tangentially in circumferential direction and essentially parallel to the surface of the fuselage. In other words, the aircraft door is displaceable in the direction of the fuselage surface.

Where in the above explanations of the hinge mechanism according to an exemplary embodiment of the present invention it was stated that the telescopic scissor-type mechanism is linkable to the fuselage, the term "fuselage" has to be interpreted in its widest sense, comprising not only the tubular fuselage structure composed of frame components, stringers and an exterior skin; instead the term "fuselage" also refers to any other structural component such as for example transverse ceiling supports and the like, that can serve as attachment- and storage surface for the hinge mechanism.

When activating the telescopic scissor-type mechanism, it will, as a rule, not rotate on a fixed rotary axis but instead on a virtual polar axis that can be displaced to a limited extent as the door moves to its final position.

As a result of the combined displacement and swivel movement that the hinge mechanism according to an exemplary embodiment of the present invention is able to enforce in a controlled manner, it is possible to slightly displace a door from a locked position, in which it fits with a positive fit in a door aperture of a fuselage, in the direction of the fuselage and then, starting from this position, to hinge it out of the fuselage to an unlocked position in a final position. In this final position, the aircraft door can, for example, be inclined downwards so that in an emergency the door can be used by passengers as an evacuation slide.

The kinematic design of the hinge mechanism and in particular the interaction of the displacement mechanism and the telescopic scissor-type mechanism may make it possible for the hinge mechanism to be operated only in a single position in order to move an aircraft door from its initial position to its final position in a controlled manner. In this arrangement, operation can, for example, take place either on the displacement mechanism or on the scissor-type mechanism, for example in the form of a continuous torque impingement, without the need for active switching over of the force transmission from the displacement mechanism to the telescopic scissor-type mechanism, or vice versa. Instead, during the movement from a home position to a final position, activation of the displacement mechanism always takes place first, while activation of the telescopic scissor-type mechanism only takes place after the displacement mechanism has ceased to operate, for example after it has come to rest against an end stop, as a result of which a force resulting from force impingement is transferred to the telescopic scissor-type mechanism. Correspondingly, an end stop can be provided which during the movement from the final position to the home position first blocks the first displacement mechanism in order to subsequently release said displacement mechanism when the scissor-type mechanism has ceased active operation.

According to an exemplary embodiment, the displacement mechanism comprises a first displacement lever that is linkable to the aircraft door, as well as a second displacement lever that is linkable to the aircraft door. These two levers are named according to their function, according to which these levers are designed and equipped to displace an aircraft door in the direction of a fuselage. Furthermore, the telescopic scissor-type mechanism comprises a first bearing lever that is linkable or connectable to the fuselage, a second bearing lever that is linkable to the fuselage, a coupling lever that is linked to the first bearing lever, a first trapezoidal lever as well as at least a second trapezoidal lever. In this arrangement these levers of the scissor-type mechanism are kinematically coupled to each other in such a way that due to activation of the telescopic scissor-type mechanism the aircraft door can be swivelled from the fuselage to a final position, on a polar axis that is aligned perpendicular to the direction of displacement.

So that the telescopic scissor-type mechanism of the aircraft door can define a kinematically determined movement between the home position and the final position, the coupling lever intersects the second bearing lever in an articulated manner so that the two levers intersect in an X-shape in the intersection region. Furthermore, the second trapezoidal lever is linked to the second bearing lever, while the first trapezoidal lever is linked to the coupling lever so that the first trapezoidal lever and the second trapezoidal lever together with the coupling lever and the second bearing lever form a closed linkage trapezium, which for the purpose of causing the tilt movement of the aircraft door can be displaced parallel in itself.

Thus the first bearing lever, the coupling lever and the first trapezoidal lever are connected in series in the order stated, thus forming a first lever pull arrangement, and the second bearing lever and the second trapezoidal lever are also connected in series, thus forming a second lever pull arrangement. In order to design the hinge mechanism in a kinematically determined way, the coupling lever and the second bearing lever intersect in an articulated manner, as already described, and also the free ends of the two lever pull arrangements in the form of the "free ends" of the first and the second trapezoidal lever are connected to each other in an articulated manner so that the first trapezoidal lever and the second trapezoidal lever together with the coupling lever as well as the second bearing lever form a closed trapezium which is designed so as to be displaceable parallel in itself.

In order to achieve the cycled movement sequence mentioned above, according to which sequence activation of the telescopic scissor-type mechanism only takes place after activation of the displacement mechanism, the first and/or the second displacement lever are/is limited in their/its freedom of movement so that the scissor-type mechanism is only activated after this freedom of movement has been completely exhausted, when the displacement mechanism has ceased operation, for example after it has come to a halt on an end stop, as a result of which a force resulting from force impingement is transferred to the scissor-type mechanism.

In other words, the first or the second displacement lever must have displaced the aircraft door from its home position in the direction of the fuselage so that activation of the telescopic scissor-type mechanism can be activated as a result of further continuous operation of the displacement mechanism or of the scissor-type mechanism.

Since aircraft doors that can be displaced and swivelled with the use of the hinge mechanism according to an exemplary embodiment of the present invention can be heavy, for example 100 kg and more, the displacement mechanism and/or the scissor-type mechanism are/is designed so as to be force impinged during discrete movement phases. As a result of such force impingement, movement of the aircraft door during discrete movement phases between its home position and its final position in the direction of its movement path defined by the hinge mechanism can be supported or decelerated so that an operator who, for example, would like to manually operate the door does not have to manually start to move or decelerate the entire door weight. Thus, for example, during the displacement movement in the direction of the fuselage, a force that assists displacement can act on the displacement mechanism and/or on the telescopic scissor-type mechanism in order to influence this movement in a supportive way so as to compensate for the heavy weight of the door, in particular if one or several of the levers of the hinge mechanism (first displacement lever, second displacement lever, first bearing lever, second bearing lever, coupling lever, first trapezoidal lever and second trapezoidal lever) are force impinged during discrete movement phases.

Such force impingement can be achieved with any desired mechanical, hydraulic, pneumatic, hydraulic, electromechanical or other drives, as well as by a combination of the above-mentioned drives; these drives being well known to the average person skilled in the art. Furthermore, force impingement can be implemented by way of non-mechanical reversible energy storage devices, for example storage devices that store electrical, pneumatic or hydraulic kinetic energy, for example in a mechanical spring. Yet another option of force impingement can be implemented with the use of a chemical drive, in which in one direction of movement of the hinge at first gas overpressure is generated, which overpressure can, for example, be temporarily stored in a chemical mixture. In the other movement direction the energy stored in this way can then be converted back to mechanical energy. Force impingement itself can, for example, take place in such a way that one of the link points of one of the above-mentioned links impinged in a rotational manner by torque. As an alternative to this it is of course also possible to achieve force impingement from a linear movement, for example in that a link point of a hinge link is displaced in a translatory manner on the fuselage.

The hinge mechanism according to an exemplary embodiment of the present invention comprises at least one indifferent equilibrium position, a so-called indifference position which is characterised in that the hinge mechanism can be moved from such a position in two directions without any forces acting from the outside. In the indifference position itself the hinge mechanism is essentially free of any forces. The characteristics of such an indifference position can be used in that force impingement in the direction of the at least one indifference position, takes place on the hinge mechanism so that the hinge mechanism is made to move in the direction of such an indifference position.

The aircraft door according to an exemplary embodiment of the present invention comprises at least one hinge mechanism that can comprise at least some of the above-mentioned characteristics. With such a hinge mechanism the aircraft door can be linked, so as to be displaceable and swivellable, to a fuselage so that the aircraft door can be displaced from its home position in the direction of the fuselage, and subsequently can be hinged on a polar axis that is perpendicular in relation to the direction of displacement, from the fuselage into a final position.

While the starting point of the present invention was a hinged door that can be hinged downwards from a fuselage, the hinge mechanism according to an exemplary embodiment of the present invention of course is also suited to hinge an aircraft door upwards or downwards or to the right or to the left. Thus the hinge mechanism according to an exemplary embodiment of the present invention can, for example, be linked to a foot region, a head region or a side region of the aircraft door.

According to a particular embodiment of the present invention, the at least one hinge mechanism, can be linked to the foot region of the aircraft door so that the aircraft door can be hinged downwards from the fuselage in the manner of a hinged door. In this case the inside of the aircraft door can be designed as a sliding surface so that the aircraft door in its hinged-out position (final position) can be used as an evacuation slide.

As has been explained in detail in the passages above, the hinge mechanism according to an exemplary embodiment of the present invention makes it possible to cause an aircraft door to make a combined displacement and swivel movement. The movement path of an aircraft door, which movement path can be achieved in this way, can be used to make the aircraft door into a complete plug-type door. To this effect, the door comprises a multitude of cams along its lateral faces. Accordingly, the door reveal of the fuselage, into which the door is to be fitted, comprises corresponding cams that can be held from behind by means of the combined displacement and swivel movement that can be generated with the hinge mechanism. It is thus not necessary to provide a separate locking mechanism because in this position, held from behind, of the cams the aircraft door is safely fitted in the door reveal.

The fuselage according to an exemplary embodiment of the present invention comprises at least one aircraft door, which, by means of at least one hinge mechanism with at least some of the above-described characteristics is linked to the fuselage so as to be displaceable and swivellable in such a way that the aircraft door can be displaced from its home position in the direction of the fuselage, from which position the aircraft door can be swivelled on a polar axis that is aligned perpendicularly in relation to the direction of displacement, from the fuselage into a final position.

Finally, the invention provides for the use of a hinge mechanism with the above-described characteristics so as to, with it, displaceably and swivellably affix an aircraft door to a fuselage.

BRIEF DESCRIPTION OF THE DRAWINGS

Below, the present invention is explained in more detail with reference to an exemplary embodiment that is depicted in the enclosed figures.

Throughout all the figures, the same or corresponding reference characters are used for identical or similar elements. The illustrations in the figures are not necessarily to scale, but they indicate qualitative size relationships.

DESCRIPTION OF AN EXEMPLARY
EMBODIMENT OF THE PRESENT INVENTION

Figure 1:
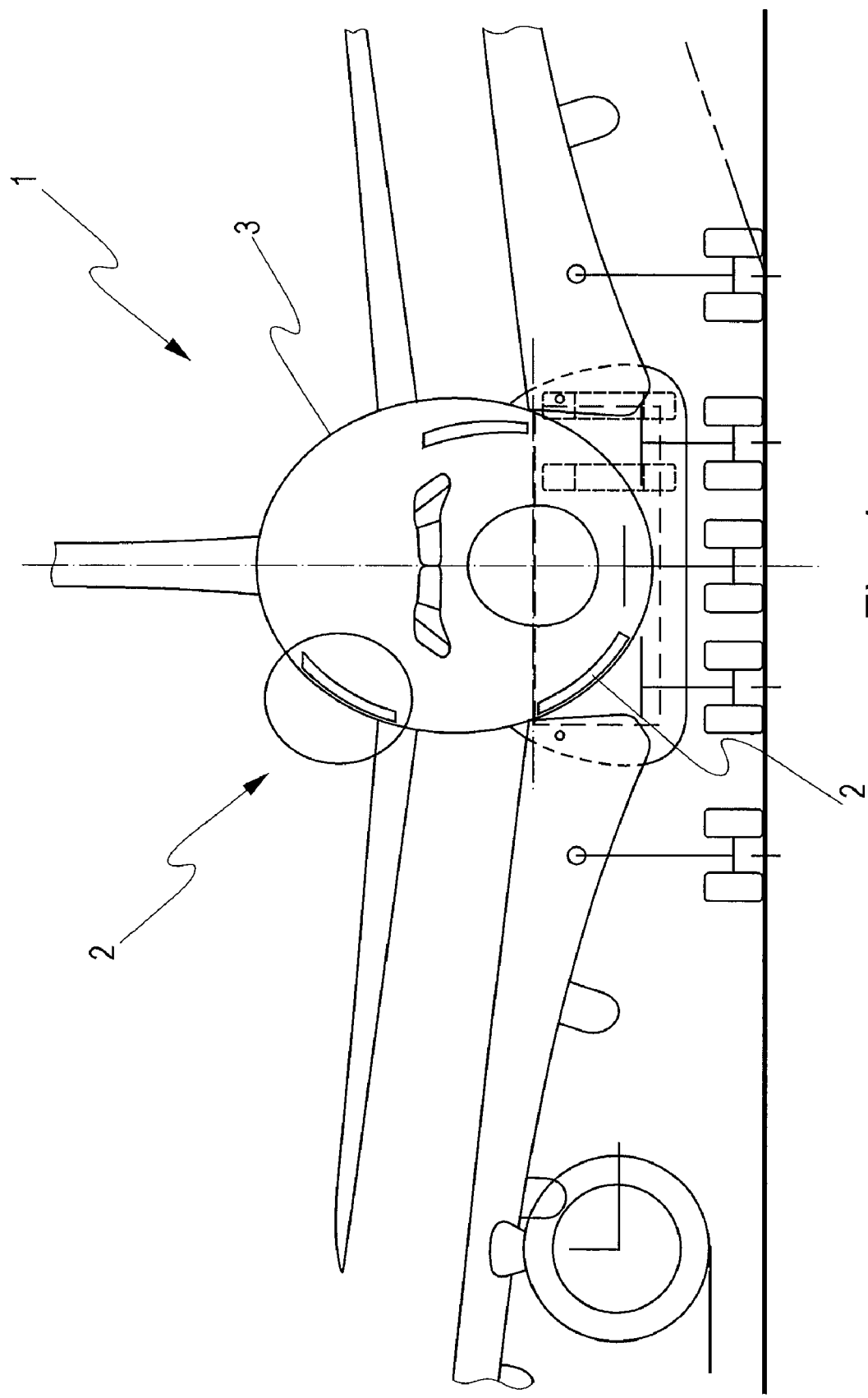
FIG. 1 shows a front view of an aircraft with two aircraft doors according to an exemplary embodiment of the present invention fitted in the fuselage.

FIG. 1 shows a front view of an aircraft 1 with a fuselage 3 into whose exterior skin two aircraft doors 2 according to an exemplary embodiment of the present invention have been fitted, as explained in detail below.

Figure 2:
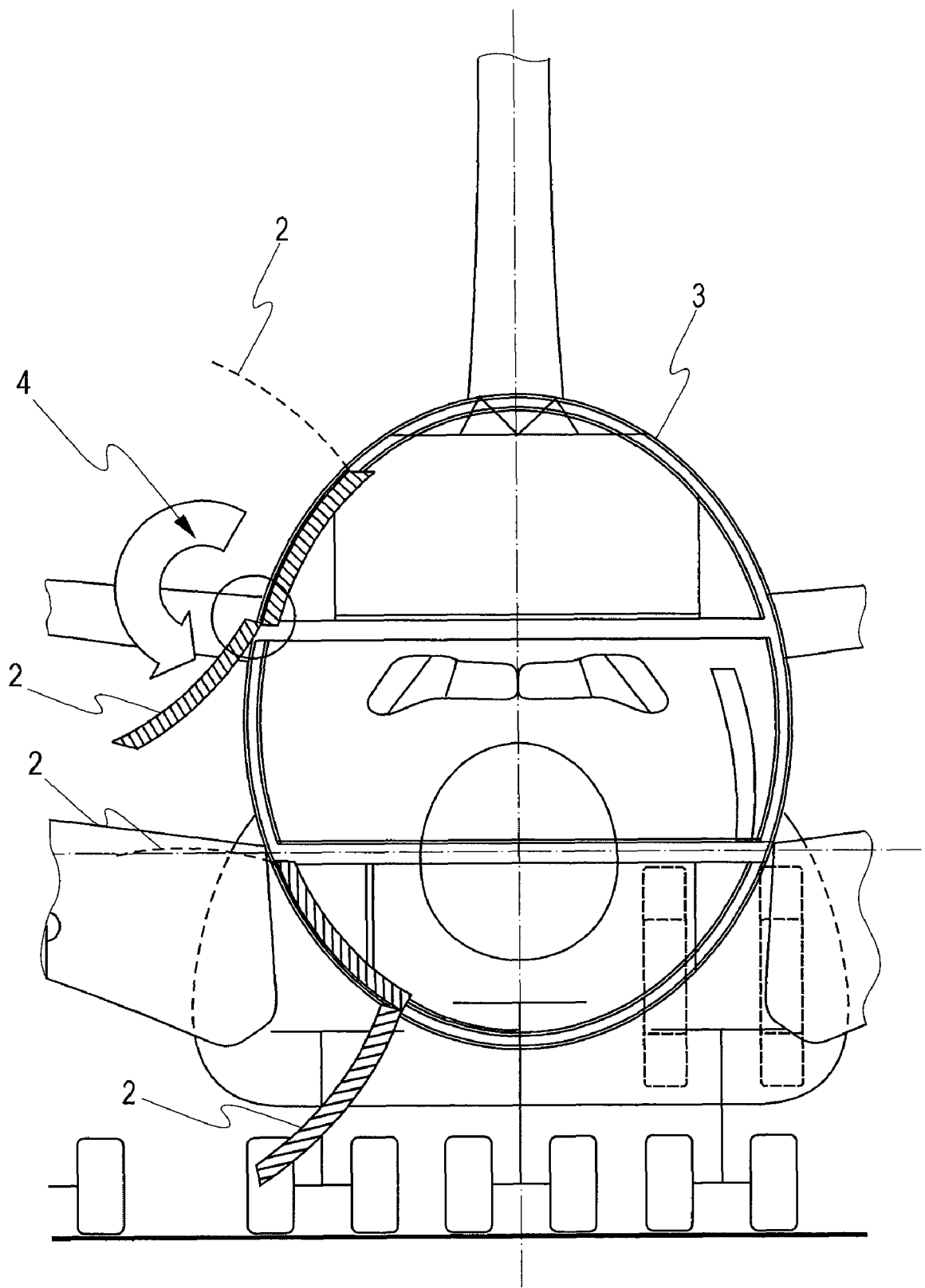
FIG. 2 shows an enlarged sectional view of FIG. 1 with two aircraft doors according to an exemplary embodiment of the present invention.
Figure 3:
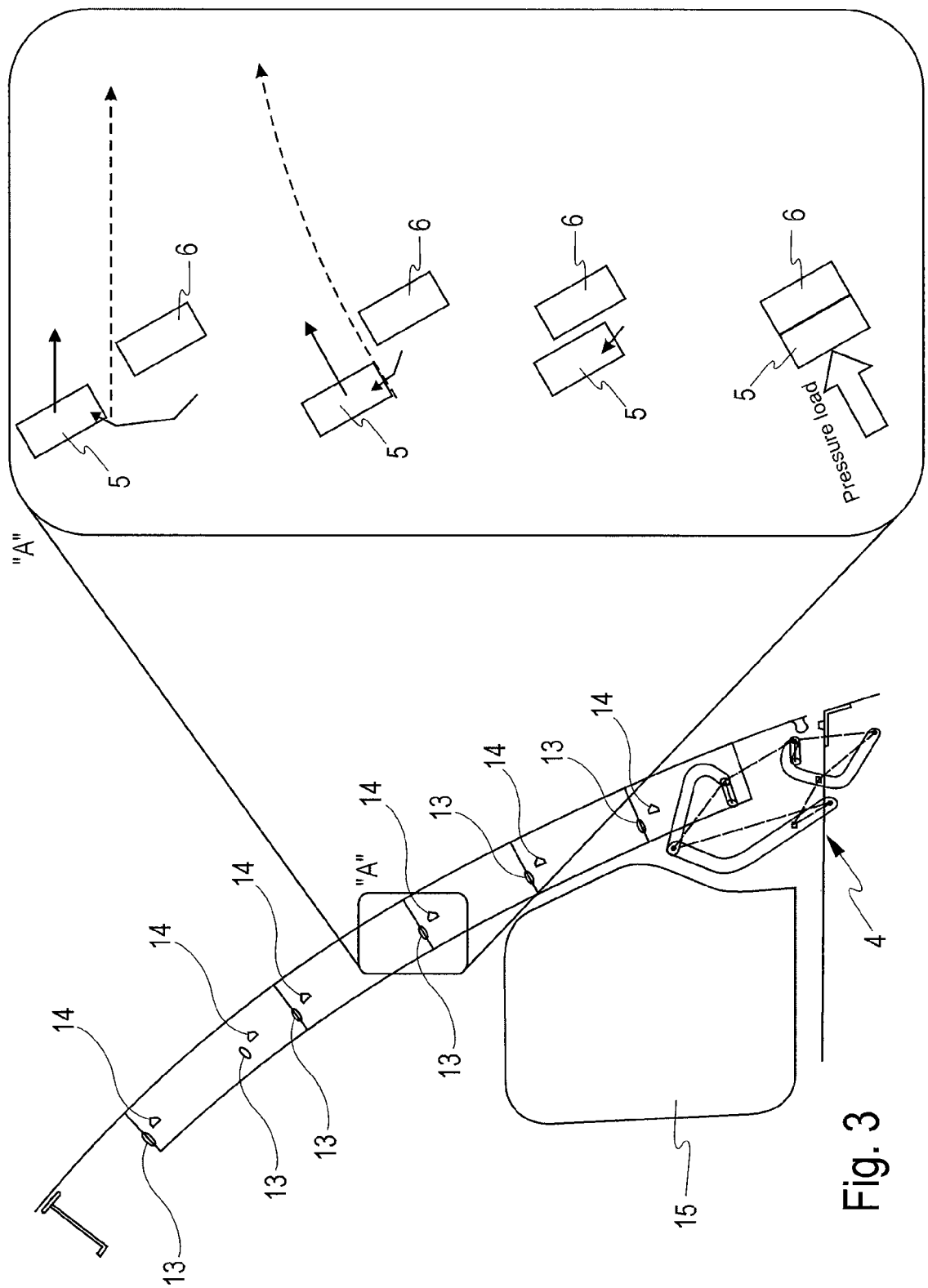
FIG. 3 shows a cross section of an aircraft door fitted in a fuselage according to an exemplary embodiment of the present invention.

FIG. 2 shows an enlarged cross section of the aircraft fuselage of FIG. 1 in the region of the aircraft doors 2 according to an exemplary embodiment of the present invention. The fuselage 3 is horizontally partitioned into three decks, of which, for example, the upper deck as well as the middle deck can be used as passenger cabins while the lower deck can be used as a cargo hold. As shown in FIG. 3, the upper deck of the fuselage 3 comprises an aircraft door 2 which, as indicated by the arrow, can be hinged open from a closed position, in which it fits into the fuselage, to an open position. Instead of hinging the aircraft door 2 downwards as shown, with the use of the hinge mechanism according to an exemplary embodiment of the present invention it would also be possible to design the aircraft door 2 so that it hinges upwards. Analogous to the upper deck, the cargo hold, too, comprises an aircraft door 2 according to an exemplary embodiment of the present invention, which, depending on the arrangement of the hinge mechanism according to an exemplary embodiment of the present invention, can be designed so as to either hinge upwards or hinge downwards.

FIG. 3 shows a cross section of an aircraft door according to an exemplary embodiment of the present invention, including a hinge mechanism 4 according to an exemplary embodiment of the present invention, which hinge mechanism 4 is linked to the foot region of the aircraft door. In its lateral face the aircraft door 2 comprises a multitude of cams 13 that protrude from the lateral face of the aircraft door from the drawing plane into the depth. Correspondingly, the door reveal provided in the fuselage 3 also comprises a multitude of cams 14 which protrude from the drawing plane outward towards the front. The number of the cams 14 in the door reveal matches the number of the cams 13 on the face of the aircraft door, so that each cam 13 is associated with a cam 14. In a completely closed door position, the cams 13 hold the cams 14 from behind, as shown in the lowermost diagram of the zoomed section A. In that each cam 13 comes to rest, as shown in the diagram, behind a cam 14, against said cam 14, it can be ensured that due to the overpressure present in the passenger cabin the door 2 is pushed radially outwards, as a result of which the cams 13 exert pressure onto the cams 14. As a result of the so created friction engagement and/or positive locking engagement, the door 2 is in a secured position, which can additionally be secured by way of locking the hinge mechanism 4 of another mechanism that kinematically interacts with the hinged mechanism 4 or with an additional separate locking mechanism.

In the sectional view shown in FIG. 3 the door 2, by means of the hinge mechanism, has already been slightly moved upwards in circumferential direction of the fuselage 3 (second diagram of section "A") so that the cams 13 of the aircraft door 2 no longer reach behind the cams 14 in the door reveal. Instead, in the position of the aircraft door 2, which position is shown in FIG. 3, a position has been reached in which the aircraft door 2 can be swivelled to the outside by the hinge mechanism 4 according to an exemplary embodiment of the present invention, as is shown by the outward-directed arrows of the first and the second diagram of section "A". As will be explained in detail below, the hinge mechanism 4 according to an exemplary embodiment of the present invention is able to cause the door 2 to make a circumferential translatory displacement movement almost tangentially in circumferential direction of the aircraft fuselage 3, and to make the subsequent movement of the aircraft door 2 radially outwards, away from the fuselage 3.

Figure 4:
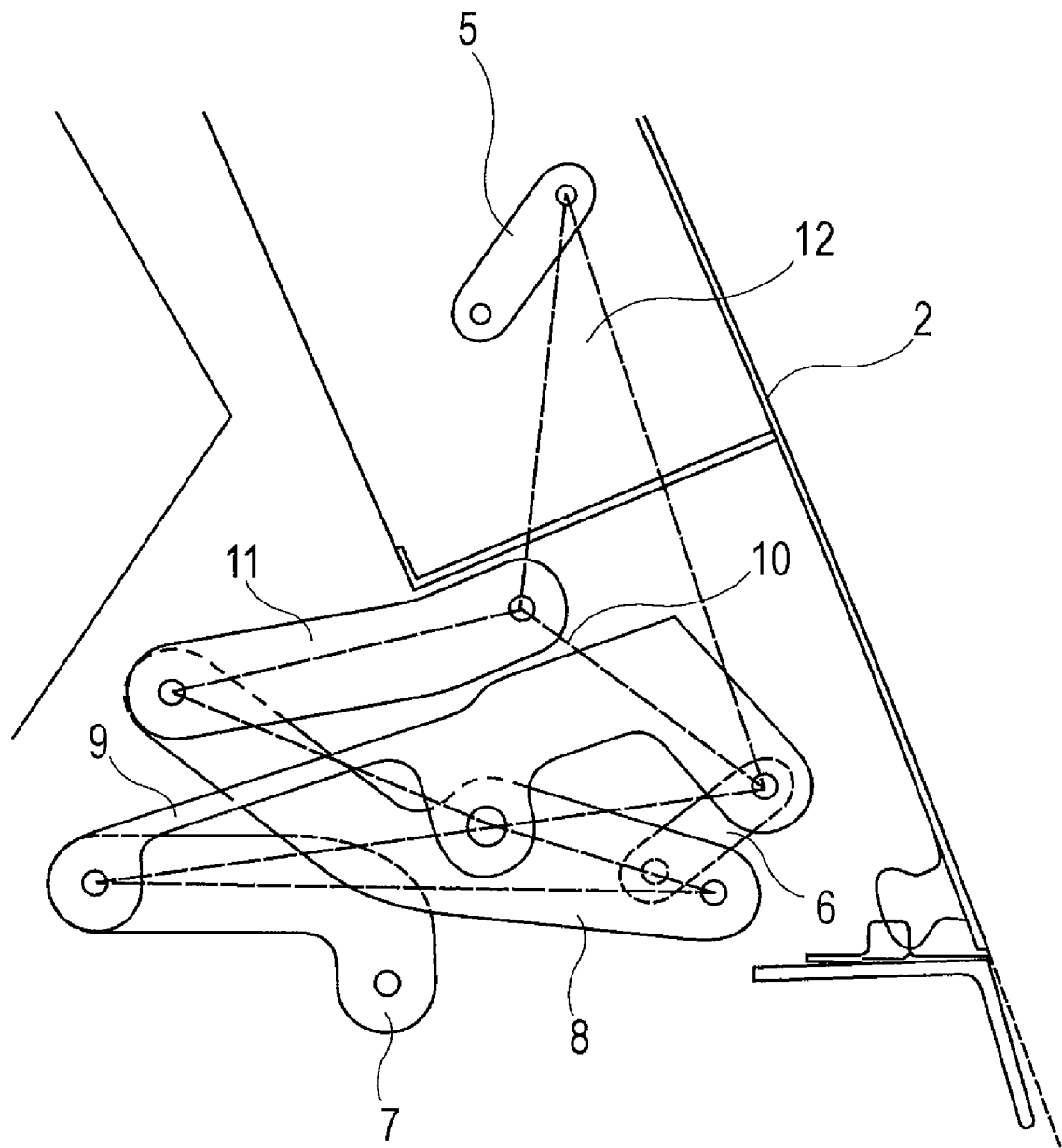
FIG. 4 shows an overview of the individual elements of the hinge mechanism according to an exemplary embodiment of the present invention.

Below, with reference to FIGS. 4-14, the hinge mechanism according to an exemplary embodiment of the present invention, and in particular its kinematics, are explained in more detail. FIG. 4 shows a section of FIG. 3 in the foot region of the aircraft door 2. The aircraft door 2 is connected to a transverse support 14 by the hinge mechanism 4 according to an exemplary embodiment of the present invention, which transverse support, in conjunction with other transverse supports forms a floor grid for an aircraft. FIG. 4 shows the home position of the hinge mechanism according to an exemplary embodiment of the present invention, in which cams 13 on the door completely reach behind the cams 14 on the fuselage.

The hinge mechanism 4 essentially comprises seven levers which in part are interconnected among each other so as to be jointed. In line with their functions the individual levers can be divided as a displacement mechanism and a telescopic scissor-type mechanism. The scissor-type mechanism essentially comprises a first bearing lever 7, a second bearing lever 8, a coupling lever 9, as well as a first trapezoidal lever 10 and a second trapezoidal lever 11. In contrast to this, the displacement mechanism only comprises a first displacement lever 5 and a second displacement lever 6. The displacement mechanism, or the displacement levers 5, 6 of the displacement mechanism is/are interconnected with the telescopic scissor-type mechanism by way of a coupling disc 12, which can, for example, be formed by a rigid triangular brace cable or by one of the trapezoidal braces itself.

The telescopic scissor-type mechanism essentially comprises two lever pull arrangements, of which the first lever pull arrangement is formed by the first bearing lever 7, the coupling lever 9 as well as the first trapezoidal lever 10 in the sequence mentioned. In this arrangement the individual levers are interconnected with each other in a jointed manner, wherein the first bearing lever itself is designed to be linked to the fuselage 3. The second lever pull arrangement is formed by the second bearing lever 8 and the second trapezoidal lever 11, which are interconnected in a jointed manner, and wherein the second bearing lever 8 in turn is designed to be connected in an articulated manner to the fuselage 3 so as to be offset in relation to the first bearing lever 7. The two bearing pull arrangements comprise two intersection points at which said bearing pull arrangements are connected in a jointed manner to the respective other lever pull arrangement. Thus the coupling lever of the first lever pull arrangement intersects the second bearing lever 8, at which position the two levers 9, 8 are connected to each other in a jointed manner. The free end of the first lever pull arrangement, which free end is created by the free end of the trapezoidal lever 11, is connected in a jointed manner to the free end of the second lever pull arrangement, which free end is created by the free end of the second trapezoidal lever 10. In this manner the five levers 7, 8, 9, 10, 11 form a telescopic scissor-type mechanism which due to its system-inherent kinematics is suitable for generating a swivel movement that will be explained in more detail below.

As already mentioned, the displacement mechanism is essentially formed by the first displacement lever 5 and the second displacement lever 6. As shown in FIG. 4, the left-hand end of each of the two displacement levers 5, 6 is linked in an articulated manner to the aircraft door 2. In the exemplary embodiment shown in FIG. 4, coupling the displacement levers 5, 6 to the telescopic scissor-type mechanism takes place by way of a triangular coupling disc 12, which in turn can at the same time form the first trapezoidal lever 10. As an alternative, the coupling disc 12 can also be formed by way of a brace triangle, which is rigid per se, in which one side can be formed by the first trapezoidal lever 10.

As will be shown below with reference to the further figures, the two displacement levers 5, 6, which in the context of the present invention are also referred to as the "displacement mechanism", are used to displace the aircraft door 2 from its home position (as shown in FIG. 4) in the direction of the fuselage. In contrast to this, the further links 7, 8, 9, 10, 11, which in the context of the present invention are also referred to as the "telescopic scissor-type mechanism", are used to swivel the aircraft door out of the fuselage, on a polar axis that is aligned perpendicularly in relation to the displacement direction, into a final position.

Figure 5:
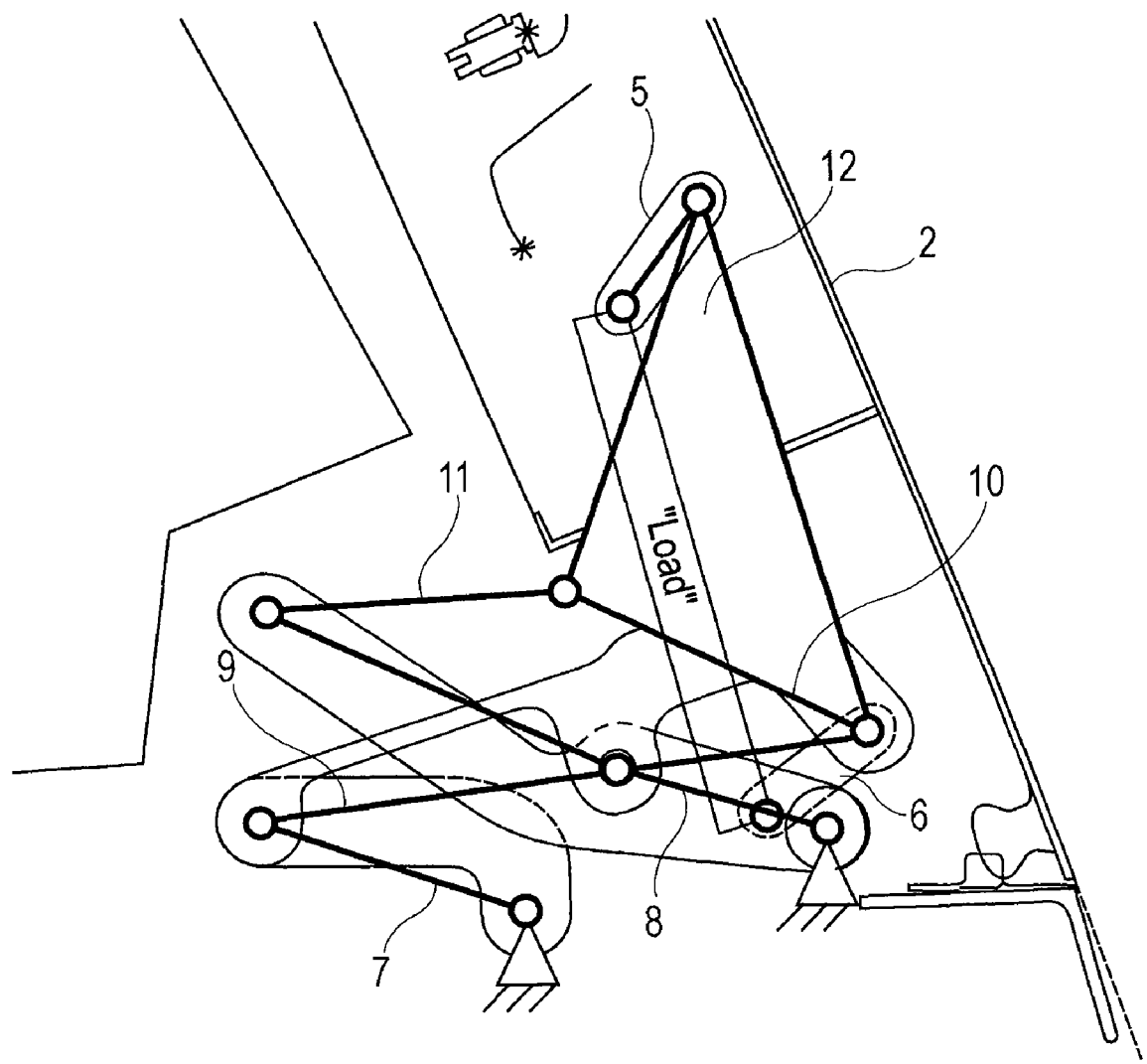
FIG. 5 shows and explains the kinematic system on which the hinge mechanism according to an exemplary embodiment of the present invention is based.

To provide a better understanding of the kinematics of the scissor-type mechanism 4, FIG. 5 shows the kinematics system on which said hinge mechanism 4 is based, wherein the scissor-type character of the system is shown particularly clearly. Although the individual levers of the hinge mechanism according to an exemplary embodiment of the present invention are of a shape that is specially arranged and is bent in part, the hinge mechanism 4 can be simplified in the form of the kinematics disc system of FIG. 5.

Figure 6A:
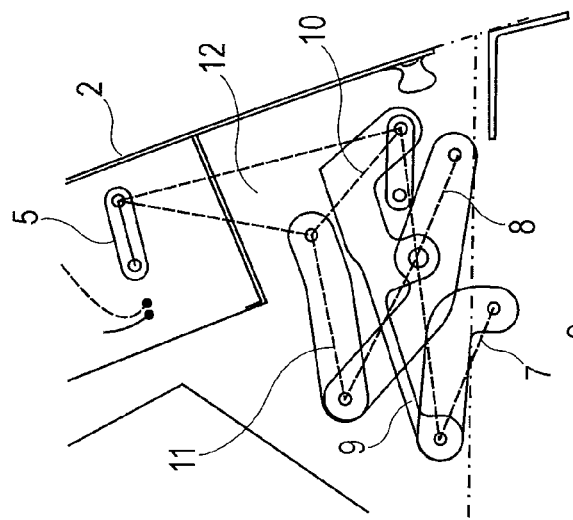
FIG. 6a-6d show the four movement states of the hinge mechanism according to an exemplary embodiment of the present invention.

Below, with reference to FIGS. 6a-6d the kinematics and the movement sequence of the hinge mechanism according to an exemplary embodiment of the present invention during different movement states is explained. As shown in FIG. 6a the aircraft door 2 is in a closed position in which it forms part of the exterior skin of the fuselage 3. With the door 2 in this position, the hinge mechanism is in its home position in which the cams 13 on the door completely reach behind the cams 14 on the fuselage. In order to unlock the position of the aircraft door 2, which position is shown in FIG. 6a, the displacement mechanism of the two displacement levers 5, 6 is activated in that at least one of the two displacement levers 5, 6 is rotated clockwise, to a certain extent, by force impingement. By means of such activation of the displacement levers 5, 6 the door 2 is slid tangentially upwards in circumferential direction of the fuselage 3, as indicated in FIG. 6b by an arrow, so that the cams 13 no longer reach behind the cams 14 on the fuselage, and thus the door is released for hinging open towards the outside.

Figure 6B:
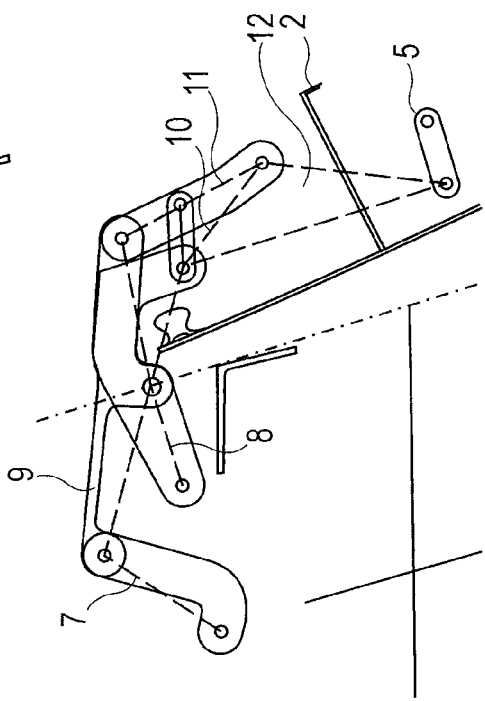

In the position shown in FIG. 6b the displacement levers 5, 6 have reached their final position in relation to the aircraft door 2, which position in relation to the aircraft door 2 they will not leave during further movement phases. The freedom of movement of the displacement levers 5, 6 in clockwise direction can, for example, be delimited by end stops on the aircraft door 2 or on one of the displacement levers 5, 6 itself, as a result of which the further movement of the displacement levers 5, 6 in clockwise direction is impeded. Such limitation of the freedom of movement leads to a situation in which with further continuous force impingement of the displacement levers 5, 6 the forces originating from force impingement are transferred to the scissor-type mechanism so that said mechanism is activated.

Figure 6C:
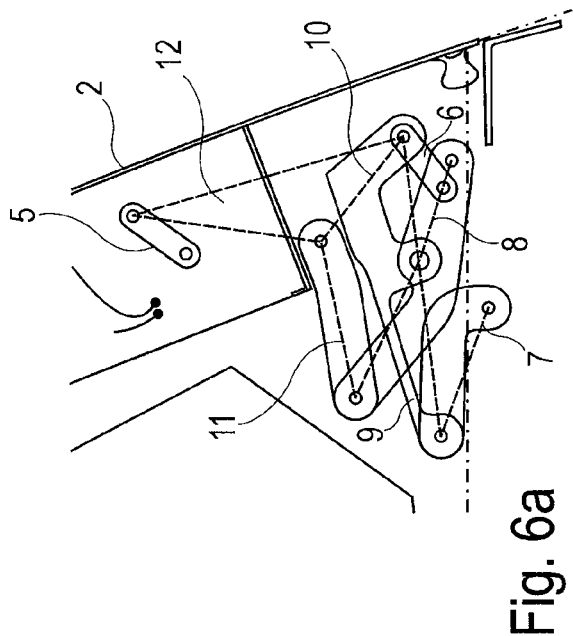

Thus, starting with FIG. 6b, the aircraft door 2 shown in FIG. 6c is already in a position hinged outwards by approximately 120°, in which position, starting with FIG. 6b, the scissor-type mechanism has telescoped or opened apart, as a result of which the coupling point of the two trapezoidal links 10, 11 in clockwise direction has almost completed a sector of a circle. As already mentioned, the position of the displacement levers 5, 6 as shown in FIG. 6b has not changed in FIG. 6c.

Figure 6D:
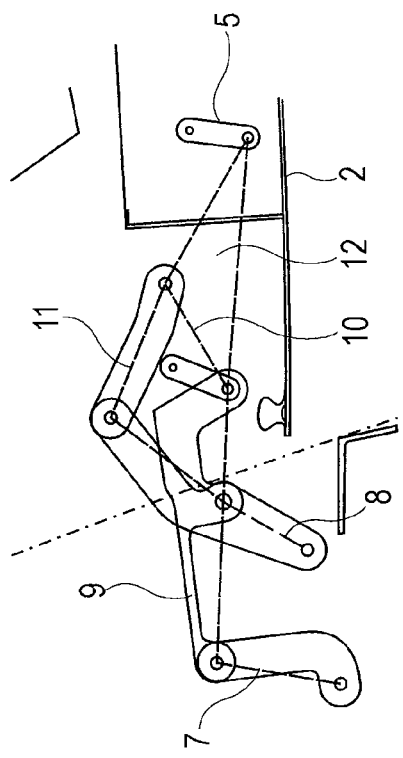

In FIG. 6d the aircraft door together with the hinge mechanism 4 has reached its final position in which it has been hinged from its home position (FIG. 6a) outwards by approximately 180°. In this position, too, the position of the displacement levers 5, 6 in relation to the aircraft door has not undergone any further change so that for further movement of the door only the kinematics of the telescopic scissor-type mechanism 7, 8, 9, 10, 11, 12 is responsible. Thus, the scissor-type mechanism, starting from the position shown in FIG. 6c, has further telescoped or opened apart, as a result of which the coupling point of the two trapezoidal levers 10, 11 has continued its circular path clockwise. As shown in FIG. 6d, in this final position the coupling lever partially covers the second bearing lever 8. In order to prevent any further hinging of the mechanism, for example one of the two levers 8, 9 can comprise an end stop, which in the position shown in FIG. 6d moves to join up against the respective other lever, as a result of which further movement of the hinge mechanism and thus of the door can be impeded.

In order to operate the hinge mechanism 4 it is, for example, possible to impinge one of the linkage points of the displacement levers 5, 6 with torque with the use of a drive means such as, for example, an electric motor, a hydro motor, a spring drive or merely manual operation. Such torque impingement on one of the displacement levers 5, 6 can be continuously maintained during the entire movement sequence of the aircraft door 2 from its home position into its final position so as to generate the swivel movement, because, due to the kinematics of the hinge mechanism, the displacement mechanism 5, 6 is always fully activated first until its freedom of movement is completely exhausted, before force impingement is transferred from one of the displacement levers 5, 6 to the remaining levers 7, 8, 9, 10, 11, 12 so as to activate said levers.

Since the hinge mechanism 4 according to an exemplary embodiment of the present invention comprises at least one indifference position it can be advantageous if one or several linkage points of the hinge mechanism 4 comprise torsion springs so as to in this way support the hinge mechanism 4 in the direction of this indifference position, as a result of which it becomes possible to at least partially compensate for the weight of the aircraft door 2.

Figure 7:
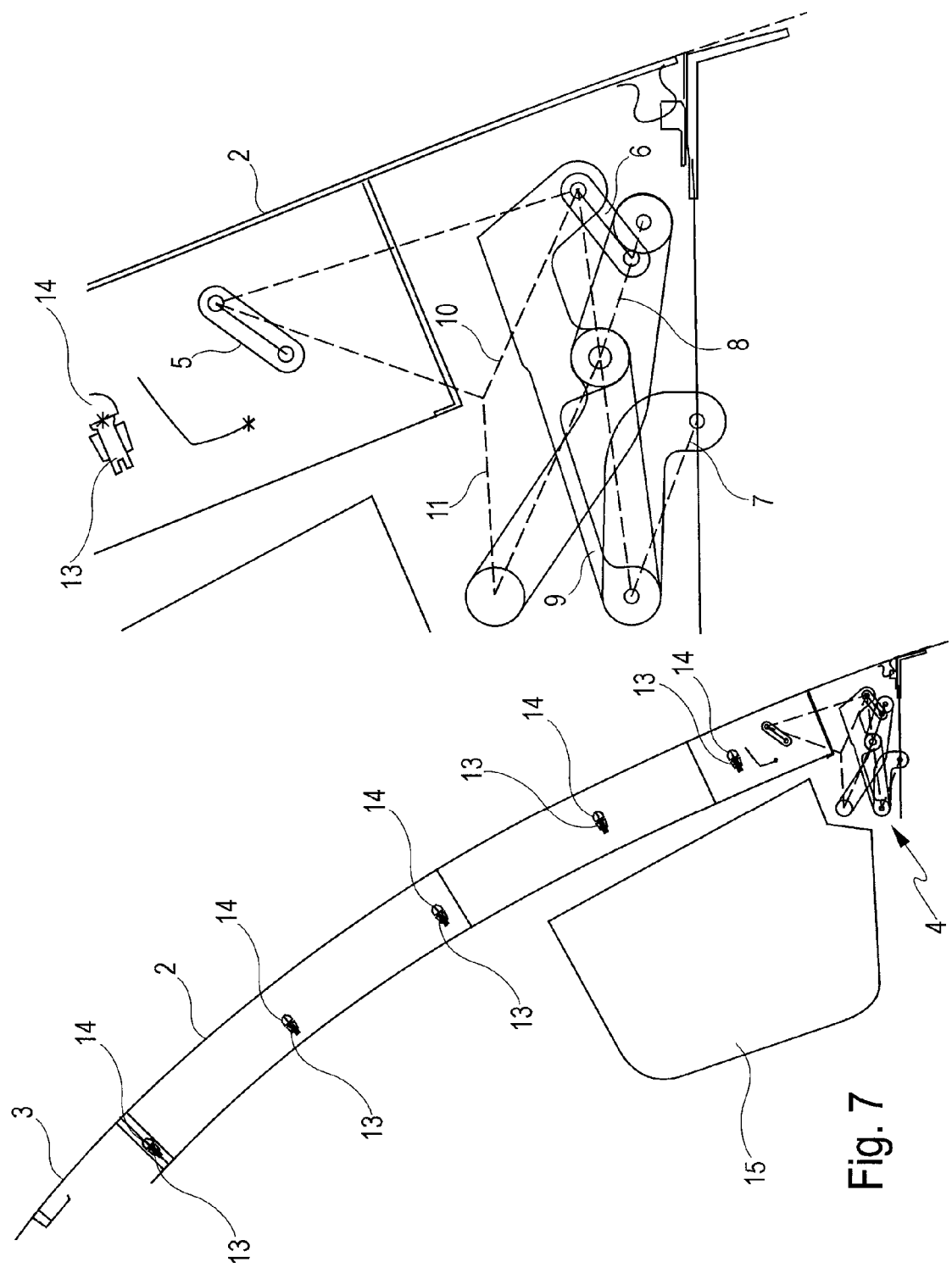
FIGS. 7-14 show in detail eight movement states of the hinge mechanism according to an exemplary embodiment of the present invention, between a home position and a final position.

Finally, with reference to FIGS. 7 to 14, a complete movement sequence of the aircraft door 2 or of the hinge mechanism 4 is briefly described. In FIG. 7 the aircraft door is in its completely closed position in which the cams 13 on the door completely reach behind the cams 14 on the fuselage. The hinge mechanism 4 is in its home position. As shown in the left-hand diagram in FIG. 7, due to the very small hinge mechanism 4 it is possible to arrange a folded inflatable evacuation slide 15 very close to the foot region of the door 2 in order to be able, in an emergency, to hinge said evacuation slide 15 outwards together with the aircraft door 2.

Figure 8:
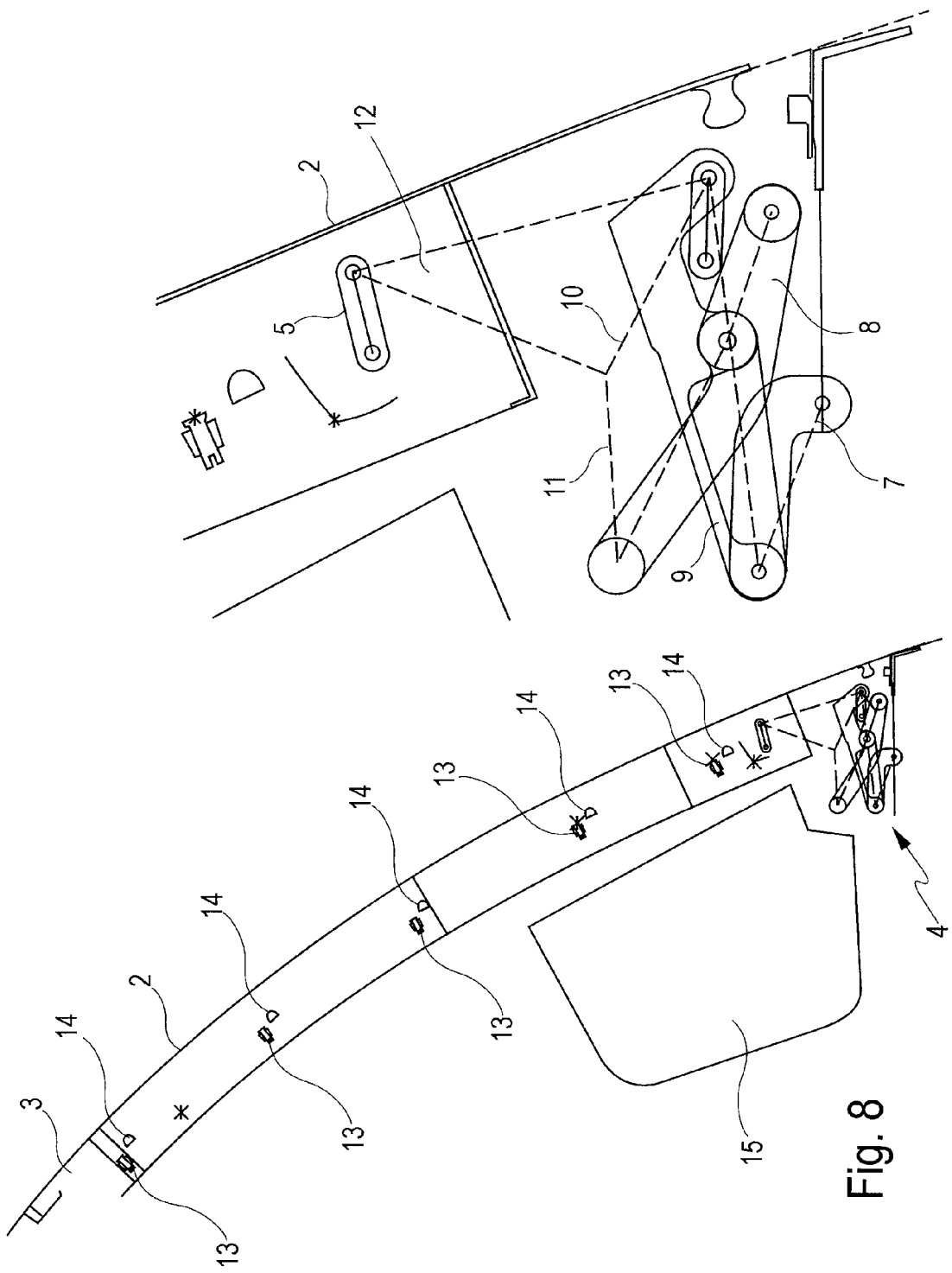

As shown in FIG. 8, starting from FIG. 7, one of the displacement levers 5, 6 is impinged with torque, as a result of which said displacement levers 5, 6 slightly rotate clockwise, thus ceasing reaching behind the cams 13, 14 in that they move the aircraft door 2 in circumferential direction of the fuselage tangentially upwards. In this position the degree of freedom of rotation of the displacement levers 5, 6 is fully exhausted so that forces emanating from further force impingement are transferred to the second link arrangement.

Figure 9:
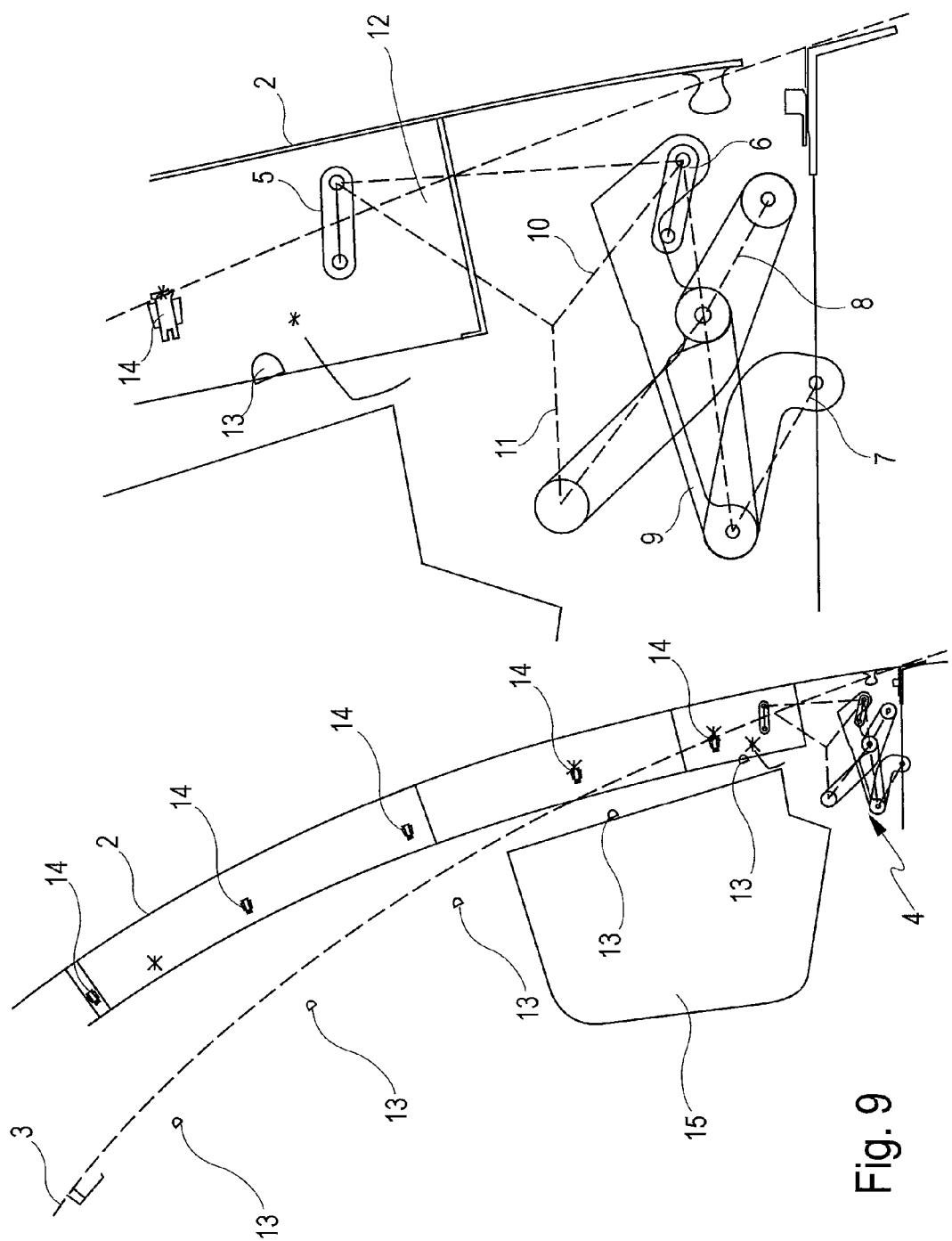
Figure 10:
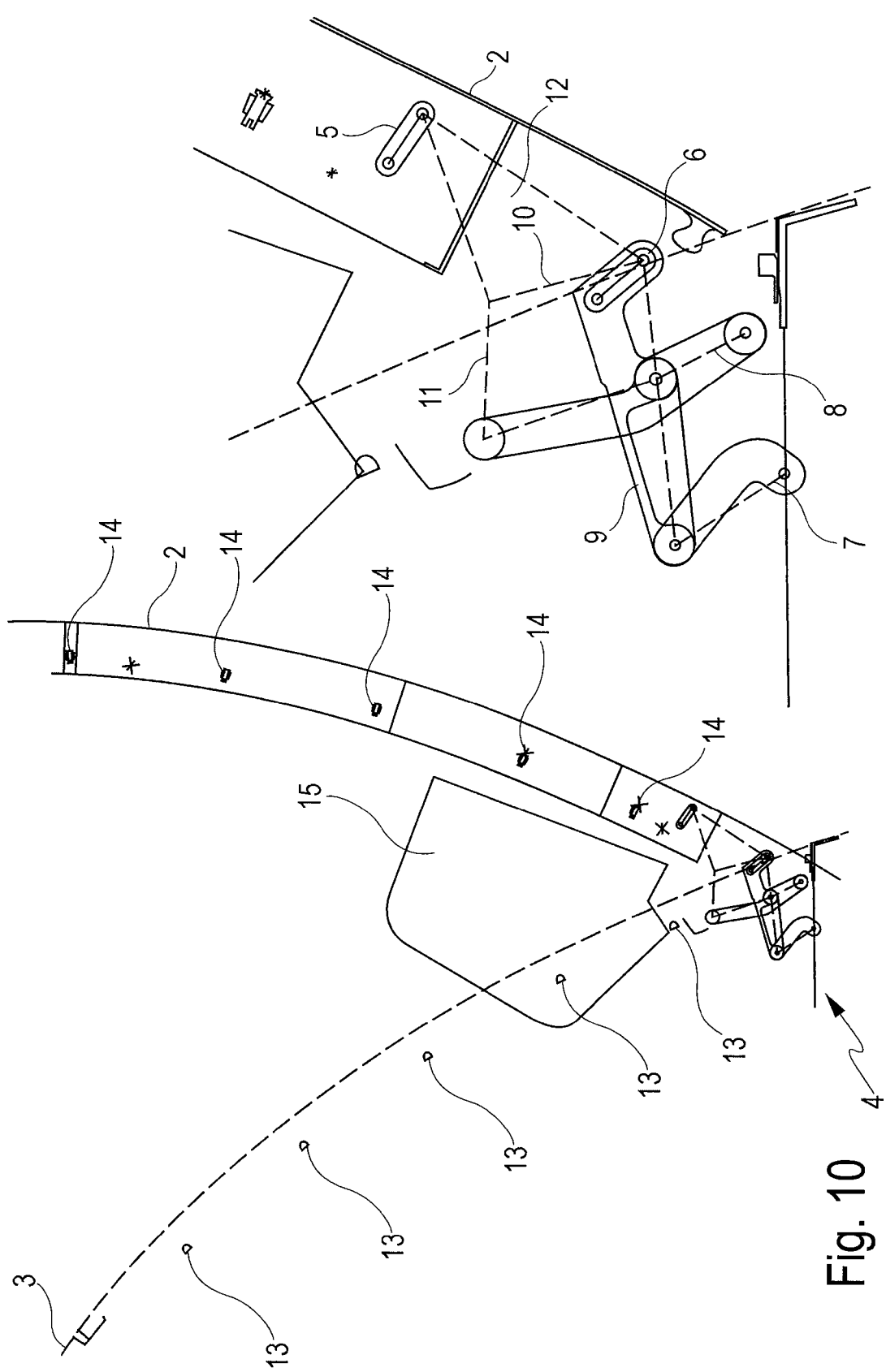
Figure 11:
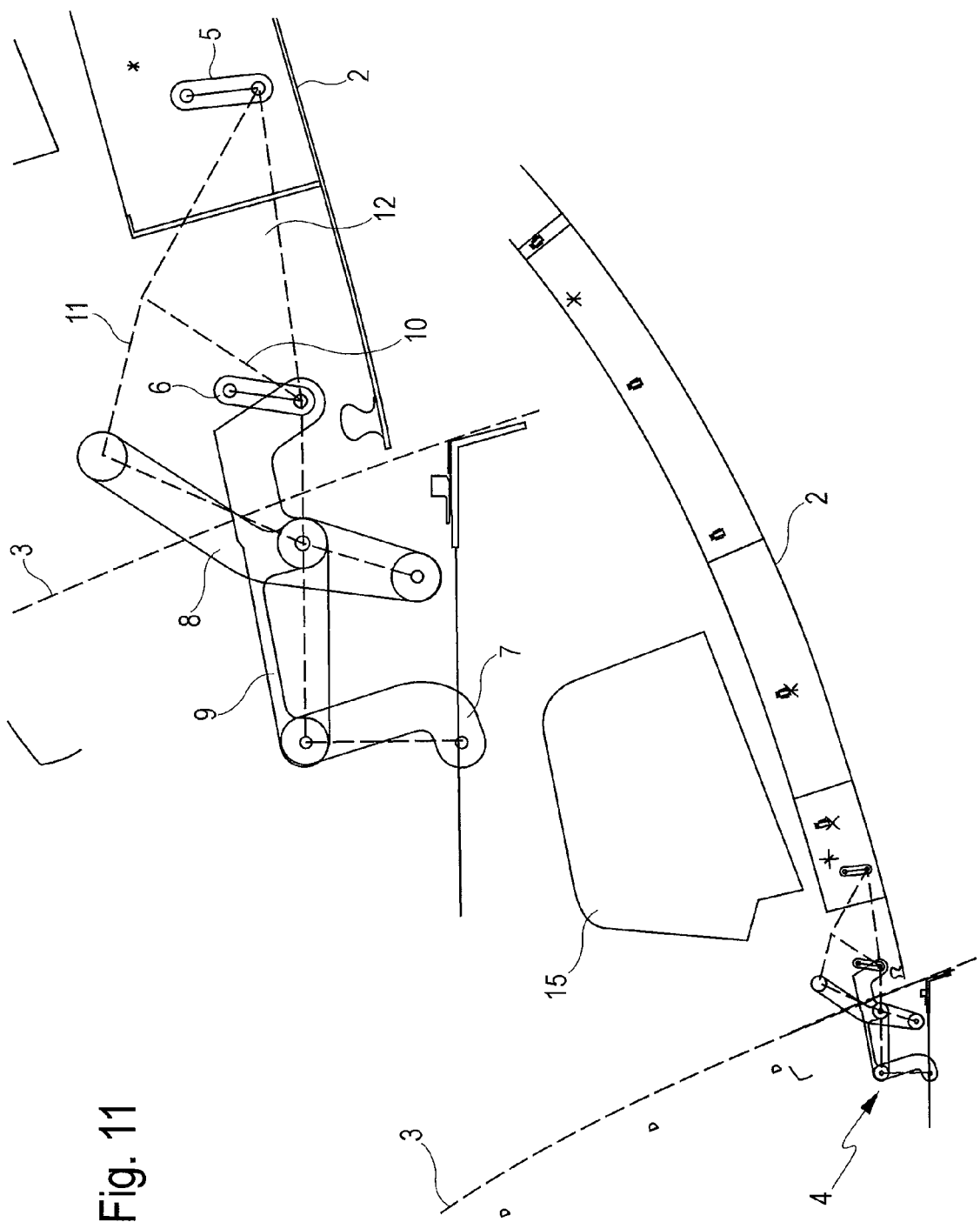
Figure 12:
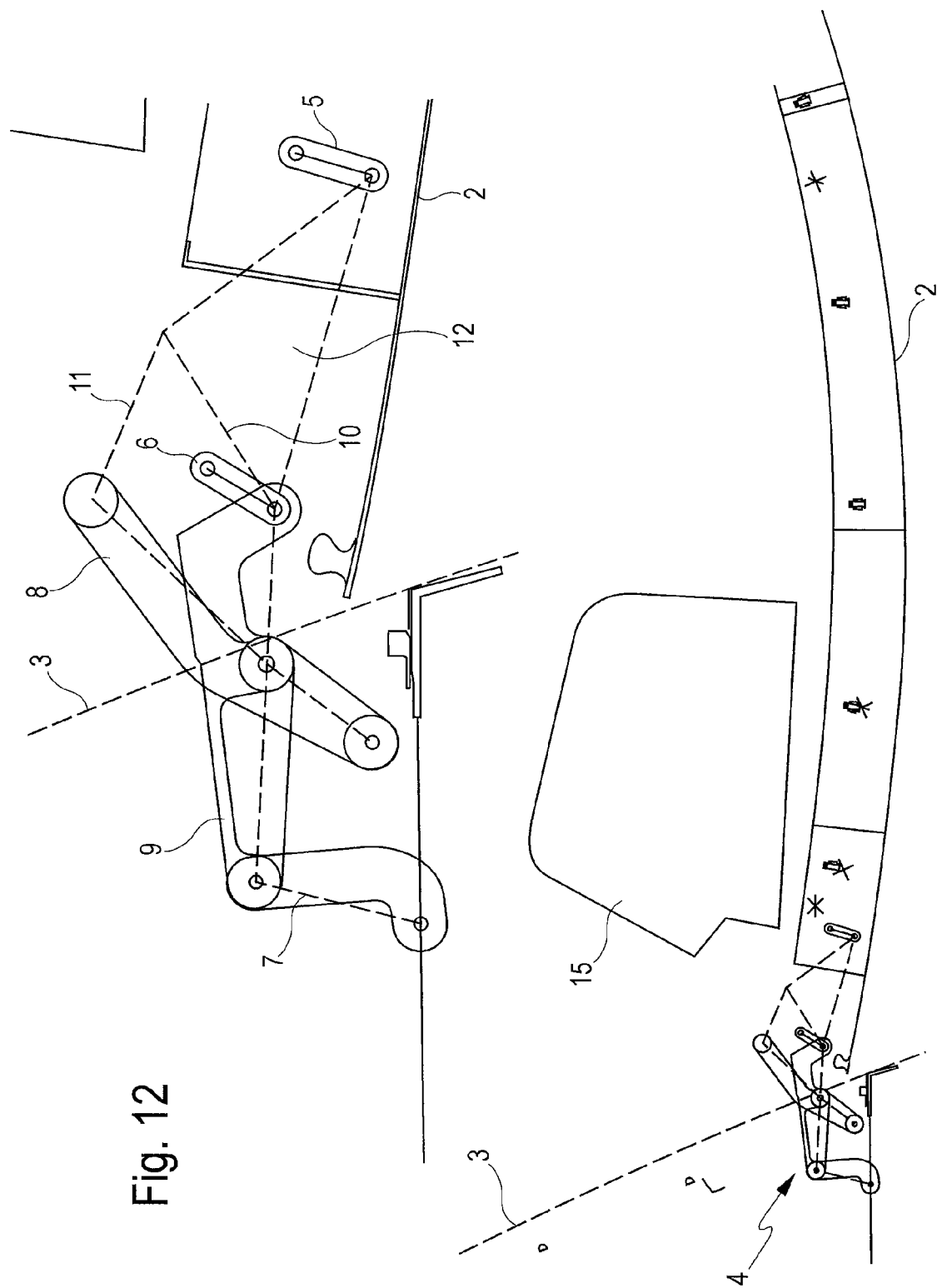
Figure 13:
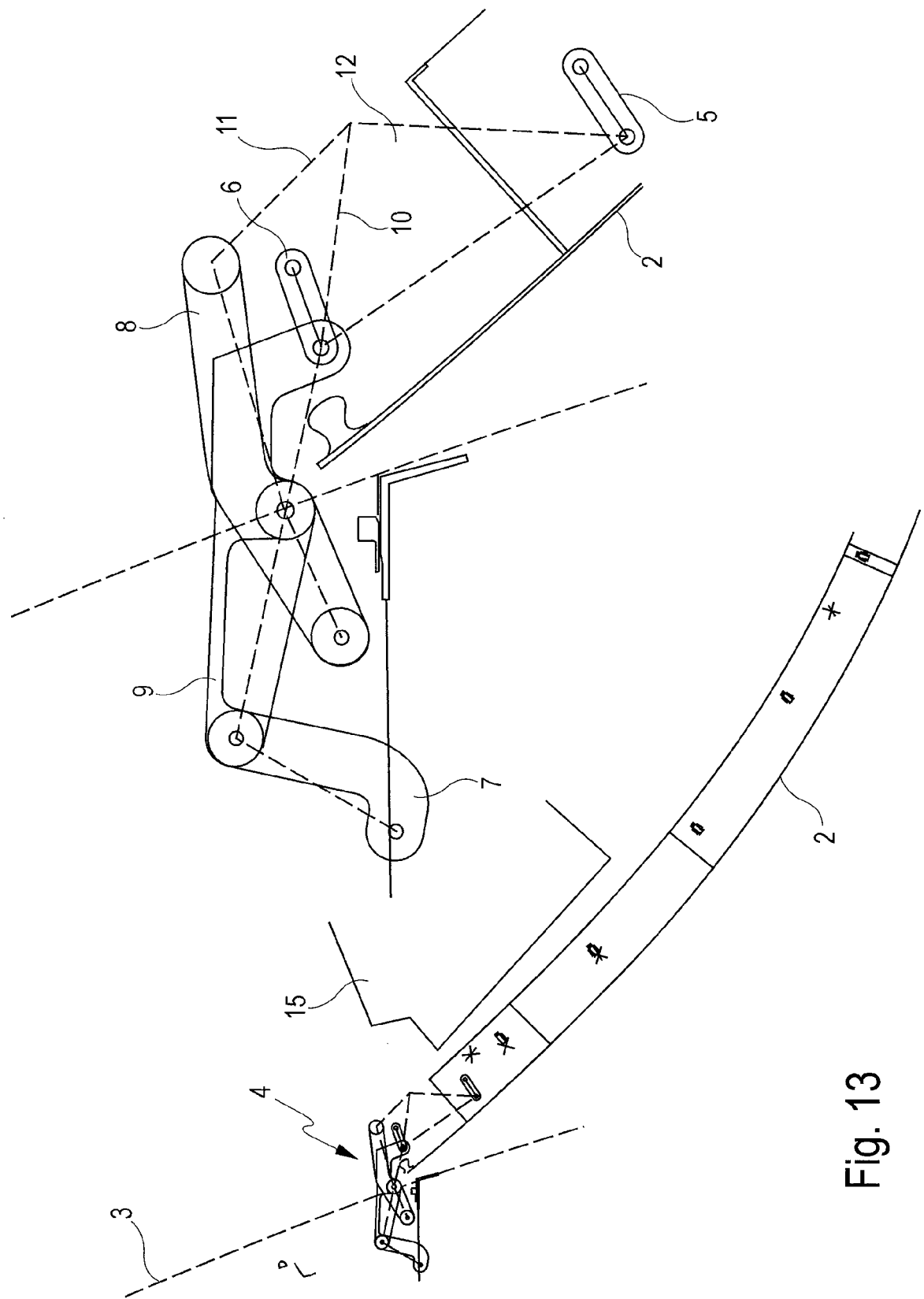

In FIG. 9 the aircraft door 2 has been hinged by approximately 15° by further force impingement on one of the two displacement levers 5, 6, wherein, starting from FIG. 8, the displacement levers 5, 6 have, however, not further rotated in relation to the aircraft door 2. As shown in the left-hand diagram of FIG. 9, the evacuation slide 13 is attached to the aircraft door 2 so that said evacuation slide 13 can be moved outwards together with the aircraft door 2.

FIGS. 9, 10, 11, 12, 13 and 14 show various swivel positions of the aircraft door 2 or of the hinge mechanism 4 according to an exemplary embodiment of the present invention, in which positions the door 2 has been swivelled out by 15°, 60°, 100°, 120°, 160° and 180° from its home position. During all these movement phases the position of the displacement levers 5, 6 in relation to the aircraft door 2 no longer changes. In FIGS. 9 to 14 the two bearing levers 7, 8 rotate throughout in clockwise direction, whereas due to the kinematics of the hinge mechanism 4, the coupling lever 9 is displaced almost exclusively in a translatory manner.

Figure 14:
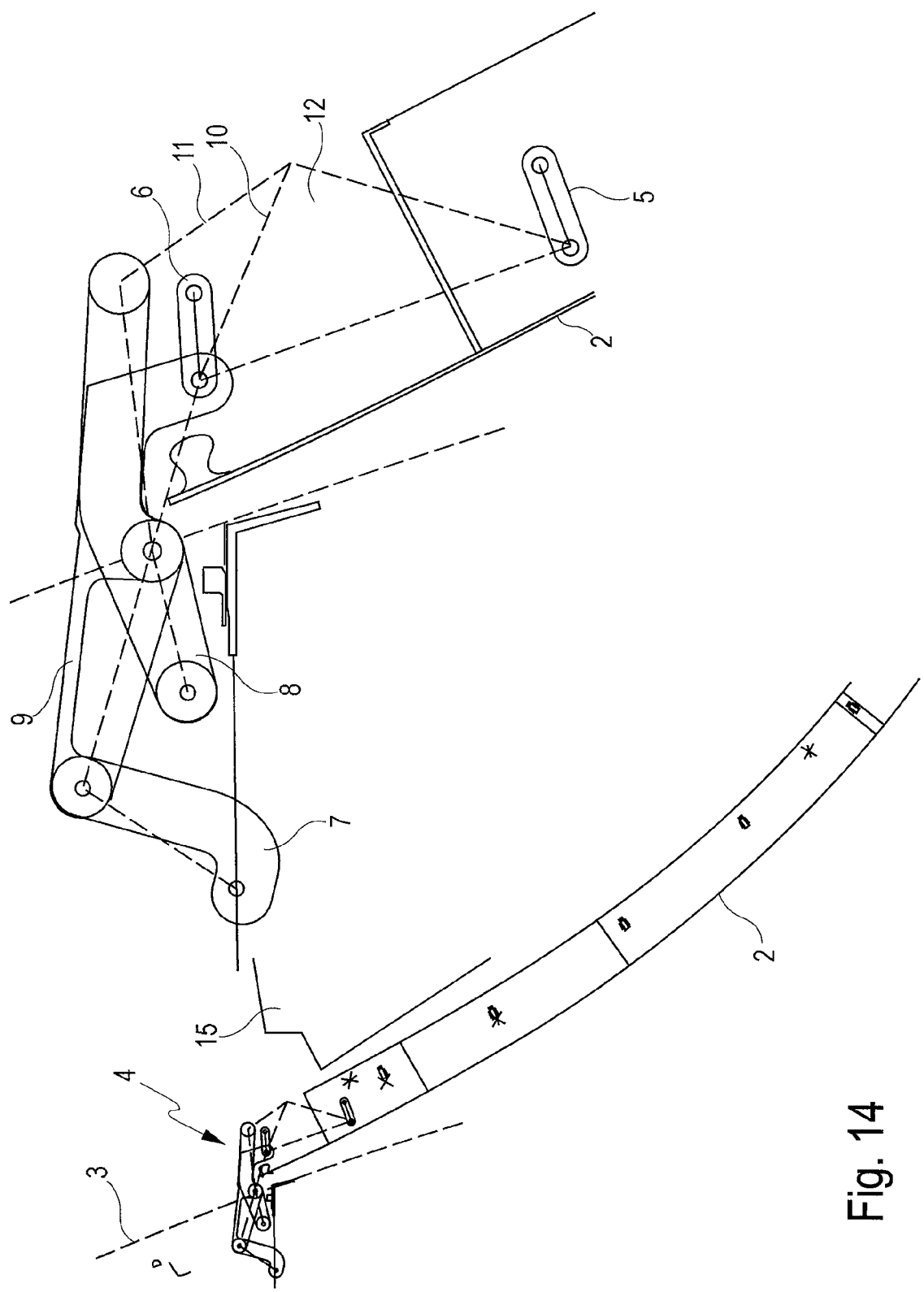

Finally, as partly shown in FIG. 14, the evacuation slide 15 is in the fully hinged-open position of the door 2 on the now outward-facing inside of the aircraft door 2 so that the aircraft door 2 can be used as a support for the evacuation slide 15 in an inflated state (not shown).

LIST OF REFERENCE CHARACTERS

1 Aircraft door
2 Door
3 Fuselage
4 Hinge mechanism
5 First displacement lever
6 Second displacement lever
7 First bearing lever
8 Second bearing lever 9 Coupling lever
10 First trapezoidal lever
11 Second trapezoidal lever
12 Coupling disc
13 Cam on the door
14 Cam on the fuselage
15 Evacuation slide

What is claimed is:

1. A hinge mechanism for an aircraft door positioned in a fuselage, the hinge mechanism positioned and configured to generate a combined displacement and swivel movement, the hinge mechanism comprising:
   a displacement mechanism physically linked to the aircraft door, and positioned and configured kinematically such that activation of the displacement mechanism displaces in a displacement direction the aircraft door from a home position, in which the aircraft door is closed, to a first open position, the displacement direction being a circumferential direction of the fuselage;
   a telescopic scissor-type mechanism physically linkable to the fuselage, the scissor-type mechanism being positioned and kinematically configured such that activation of the telescopic scissor-type mechanism swivels the aircraft door from the first open position of the aircraft door at the fuselage to a final wide open aircraft door position on a polar axis perpendicular to the direction of displacement; and
   an activation device positioned and configured to provide a continuous force impingement to the displacement mechanism and to the scissor-type mechanism such that for opening the aircraft door from the home position to the first open position, the continuous force impingement on only the displacement mechanism rotates the displacement mechanism in a moving direction while the telescopic scissor-type mechanism is stationary, and such that for opening the door beyond the first position to the final wide open aircraft door position, the continuous force impingement rotates the telescopic scissor-type mechanism in the moving direction while leaving unchanged a position of the displacement mechanism with respect to the door,
   wherein the moving direction of the displacement mechanism and a moving direction of the telescopic scissor-type mechanism comprise at least one coinciding direction component such that a continuous course of motion occurs.

2. The hinge mechanism of claim 1,
   wherein the displacement mechanism has a limited degree of freedom of movement so that when the limited degree of freedom of movement is exhausted, any further forces from further force impingement are transferred to the scissor-type mechanism.

3. The hinge mechanism of claim 1,
   wherein the hinge mechanism comprises at least one indifference position and the hinge mechanism is made to move in the indifference direction as a result of the continuous force impingement.

4. The fuselage comprising the aircraft door linked to the fuselage so as to be displaceable and swivellable by the hinge mechanism of claim 1.

5. A method of using the hinge mechanism of claim 1 to affix the aircraft door displaceably and swivellably to the fuselage.

6. The hinge mechanism of claim 1,
   wherein the displacement mechanism comprises:
   a first displacement lever having a first end, the first end of the first displacement lever linked to the aircraft door; and
   a second displacement lever having a first end, the first end of the second displacement lever linked to the aircraft door, and
   wherein the scissor-type mechanism comprises:
   a first bearing lever having a first end and a second end, the first end of the first bearing lever linked to the fuselage;
   a second bearing lever having a first end and a second end, the first end of the second bearing lever linked to the fuselage;
   a coupling lever linked to the second end of the first bearing lever;
   a first trapezoidal lever; and
   a second trapezoidal lever,
   wherein the coupling lever crosses the second bearing lever in an articulated manner, and
   wherein the second trapezoidal lever is linked to the second end of the second bearing lever, while the first trapezoidal lever is linked to the coupling lever so that the first trapezoidal lever and the second trapezoidal lever together with the coupling lever and the second bearing lever form a closed linkage trapezoid.

7. The hinge mechanism of claim 6,
   wherein the first bearing lever, the coupling lever and the first trapezoidal lever form a first lever pull arrangement, and wherein the second bearing lever and the second trapezoidal lever form a second lever pull arrangement,
   wherein the coupling lever and the second bearing lever intersect in an articulated manner, and the first trapezoidal lever is connected to the second trapezoidal lever in an articulated manner.

8. The hinge mechanism of claim 6,
   wherein the first trapezoidal lever comprises a disc that couples the displacement mechanism to the telescopic scissor-type mechanism in an articulated manner.

9. The hinge mechanism of claim 6,
   wherein at least one of the first displacement lever and the second displacement lever has a limited degree of freedom of movement, and wherein the telescopic scissor-type mechanism is activated when said limited degree of freedom of movement is exhausted.

10. The hinge mechanism of claim 6,
    wherein at least one of the levers from a group consisting of the first displacement lever, the second displacement lever, the first bearing lever, the second bearing lever, the coupling lever, the first trapezoidal lever and the second trapezoidal lever undergoes discrete movement phases in response to the continuous force impingement.

11. The hinge mechanism of claim 1,
    wherein at least one mechanism from a group consisting of the displacement mechanism and the scissor-type mechanism undergoes discrete movement phases in response to the continuous force impingement.

12. The hinge mechanism of claim 11,
    wherein the continuous force impingement takes place by way of at least one drive selected from a group consisting of a spring drive, an electrical drive, a manual drive, a hydraulics drive, a pneumatics drive and a chemical drive.

13. The hinge mechanism of claim 11,
    wherein the continuous force impingement takes place either in a linear way or in a rotatory way.

14. The aircraft door comprising the hinge mechanism of claim 1 linked to the aircraft door so that the aircraft door is displaceable and swivellable with respect to the fuselage.

15. The aircraft door of claim 14,
wherein the aircraft door comprises a lateral face and a plurality of cams positioned along the lateral face, and
wherein the fuselage comprises a door reveal with a plurality of corresponding cams operable from behind by the combined displacement and swivel movement generated by the hinge mechanism.

16. The aircraft door of claim 14, the door further comprising a foot region, a head region and a side region,
wherein the hinge mechanism is linked to the foot region, to the head region or to the side region of the aircraft door.

17. The aircraft door of claim 16, the door further comprising a sliding surface positioned on an inside of the door,
wherein the hinge mechanism is linked to the foot region of the aircraft door, and wherein the aircraft door is configured such that in the final wide open aircraft door position the sliding surface is configured as an evacuation slide.

* * * * *